(12) United States Patent
Kanbe et al.

(10) Patent No.: US 8,279,739 B2
(45) Date of Patent: Oct. 2, 2012

(54) HEAT-ASSISTED MAGNETIC RECORDING MEDIUM AND MAGNETIC STORAGE DEVICE

(75) Inventors: Tetsuya Kanbe, Chiba (JP); Yuzo Sasaki, Chichibu (JP); Atsushi Hashimoto, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/384,933

(22) PCT Filed: Aug. 19, 2010

(86) PCT No.: PCT/JP2010/063963
§ 371 (c)(1),
(2), (4) Date: Jan. 19, 2012

(87) PCT Pub. No.: WO2011/021652
PCT Pub. Date: Feb. 24, 2011

(65) Prior Publication Data
US 2012/0113768 A1    May 10, 2012

(30) Foreign Application Priority Data
Aug. 20, 2009    (JP) ................................. 2009-191167

(51) Int. Cl.
*G11B 3/70* (2006.01)
(52) U.S. Cl. ...................... 369/288; 428/832; 428/828.1
(58) Field of Classification Search ................ 369/13.24, 369/13.32, 280, 283, 286, 288; 360/59, 97.11, 360/322; 428/831, 836.2, 800, 826, 836, 428/831.2, 832.2; 204/192.2, 192.1
See application file for complete search history.

(56) References Cited

U.S. PATENT DOCUMENTS

| | | | |
|---|---|---|---|
| 6,846,583 B2 * | 1/2005 | Inaba et al. | 428/831 |
| 7,521,137 B2 | 4/2009 | Hohlfeld et al. | |
| 2003/0215675 A1 | 11/2003 | Inaba et al. | |
| 2010/0182714 A1 * | 7/2010 | Kanbe et al. | 360/59 |
| 2011/0235479 A1 * | 9/2011 | Kanbe et al. | 369/13.32 |

FOREIGN PATENT DOCUMENTS

| | | |
|---|---|---|
| JP | 2002-208129 A | 7/2002 |
| JP | 2004-213833 A | 7/2004 |
| JP | 2008-071455 A | 3/2008 |
| JP | 4069205 B2 | 4/2008 |
| JP | 4206406 B2 | 1/2009 |
| JP | 2009-158054 A | 7/2009 |
| WO | WO 2008-030199 A1 | 3/2008 |

OTHER PUBLICATIONS

En Yang, et al., "L10 FePt-oxide columnar perpendicular media with high coercivity and small grain size", Journal of Applied Physics, 2008, pp. 023904-1-023904-3, vol. 104.
International Search Report of PCT/JP2010/063963 dated Nov. 22, 2010.

* cited by examiner

*Primary Examiner* — Ali Neyzari
(74) *Attorney, Agent, or Firm* — Sughrue Mion, PLLC (57) ABSTRACT

A heat-assisted magnetic recording medium that includes a substrate, underlayers formed on the substrate, and a magnetic layer which is formed on the underlayers and contains either an FePt alloy having an $L1_0$ structure or a CoPt alloy having an $L1_0$ structure as a main component, wherein the underlayers include a first underlayer formed from an amorphous alloy, a second underlayer formed from an alloy having a BCC structure containing Cr as a main component and also containing at least one element selected from among Ti, Mo, W, V, Mn and Ru, and a third underlayer formed from MgO. Also, a magnetic storage device that uses the heat-assisted magnetic recording medium.

20 Claims, 4 Drawing Sheets

HEAT-ASSISTED MAGNETIC RECORDING MEDIUM AND MAGNETIC STORAGE DEVICE

CROSS REFERENCE TO RELATED APPLICATIONS

This application is a National Stage of International Application No. PCT/JP2010/063963 filed Aug. 19, 2010, claiming priority based on Japanese Patent Application No. 2009-191167, filed Aug. 20, 2009.

TECHNICAL FIELD

The present invention relates to a heat-assisted magnetic recording medium and a magnetic storage device using the same. Priority is claimed on Japanese Patent Application No. 2009-191167, filed Aug. 20, 2009, the content of which is incorporated herein by reference.

BACKGROUND ART

With the rapid ongoing development of the information society, there is considerable demand for further increases in the capacities of hard disk devices (HDD). In order to increase the surface recording density of a magnetic recording medium used in an HDD, the grain size of the magnetic crystal grains must be reduced. However, a problem arises in that as the magnetic grains are reduced in size, the thermal stability of the grains tends to deteriorate.

The expression KuV/kT (wherein Ku represents the crystal magnetic anisotropy constant, V represents the magnetic grain volume, k represents Boltzmann's constant, and T represents the absolute temperature) is generally used as an indicator of the thermal stability, and the value of KuV/kT must typically be 60 or more to ensure satisfactory thermal stability. Because the value of V decreases as the magnetic grains are reduced in size, the value of KuV/kT also decreases, resulting in a deterioration in the thermal stability.

In order to prevent this deterioration in thermal stability, the value of Ku must be increased, but increasing Ku causes an increase in the anisotropic magnetic field Hk. This is due to the relationship represented by Ku=(Ms×Hk)/2. If the value of Hk exceeds the recording magnetic field of the recording head, then satisfactory writing becomes impossible, and therefore Hk must be set to a value that is lower than the recording magnetic field.

This requirement determines the upper limit for Ku, and therefore the lower limit for miniaturization of the crystal grains. In order to realize a surface recording density at the 1 Tbit/inch$^2$ level, the magnetic grain size must be reduced to approximately 5 to 6 nm. However, considering that the recording magnetic field Hw of conventional recording heads is typically 10 to 12 kOe and the requirement for a value of KuV/kT is greater than 60, the limit for miniaturization of the magnetic grains is approximately 10 nm.

One technique that has been proposed to overcome this problem is heat-assisted recording. Heat-assisted recording is a recording technique in which near-field light or the like is irradiated onto the medium, thereby causing localized heating of the medium surface and reducing the coercive force of the medium, thus enabling writing to be performed. In this case, even with a recording medium having a coercive force at room temperature of several tens of kOe, the recording magnetic field of a conventional magnetic head is readily capable of writing to the medium. Accordingly, by using a material having a high Ku value in the order of $10^6$ J/m$^3$ for the recording layer, the magnetic grain size can be reduced to 6 nm or less, while retaining favorable thermal stability. Known examples of this type of high Ku material include FePt alloys (Ku: approximately 7×10$^6$ J/m$^3$) and CoPt alloys (Ku: approximately 5×10$^6$ J/m$^3$) having an L1$_0$ crystal structure.

In heat-assisted recording, the magnetic layer preferably adopts a granular structure in which high Ku magnetic crystal grains of an aforementioned FePt alloy or the like are divided into segments by an oxide such as SiO$_2$. By employing a granular structure, exchange interaction between the magnetic grains is reduced, and the grain size of the magnetic crystal grains can also be reduced.

Patent Documents 1 to 3 disclose techniques related to heat-assisted recording. Patent Document 1 relates to a magnetic recording medium in which, following formation of a recording layer composed of FePt nanoparticles, the recording layer is irradiated with a laser beam spot to promote crystallization and orientation of the recording layer. Further, Patent Document 2 relates to a magnetic recording medium that includes an FePt alloy having an L1$_0$ crystal structure. Moreover, Patent Document 3 discloses a patterned thin film provided with regions of low thermal conductivity within a material of high thermal conductivity, and also discloses a structure in which this type of thin film is used as a temperature control layer within a heat-assisted magnetic recording medium.

Non-Patent Document 1 discloses that by adding 38% of SiO$_2$ to FePt, the magnetic grain size can be reduced to 5 nm. Further, the same document also discloses that by further increasing the amount of added SiO$_2$ to 50%, the grain size can be reduced to 2.9 nm.

PRIOR ART DOCUMENTS

Patent Documents
Patent Document 1:
Japanese Unexamined Patent Application, First Publication No. 2008-71455
Patent Document 2:
Japanese Patent (Granted) Publication No. 4,069,205
Patent Document 3:
Japanese Patent (Granted) Publication No. 4,206,406
Non-Patent Documents
Non-Patent Document 1: J. Appl. Phys., 104, 023904 (2008)

DISCLOSURE OF INVENTION

Problems to be Solved by the Invention

An object of the present invention is to reduce exchange coupling between magnetic grains and reduce the magnetic cluster size to realize a heat-assisted magnetic recording medium having a surface recording density at the 1 Tbit/inch$^2$ level.

As described above, by using a material having a high Ku value such as an FePt alloy with an L1$_0$ structure for the magnetic layer, the magnetic grain size can be reduced while retaining favorable thermal stability.

In those cases where an FePt alloy with an L1$_0$ structure is used for the magnetic layer, MgO having an NaCl structure is typically used as the underlayer. This is because by forming the FePt alloy having the L1$_0$ structure on top of a (100)-oriented MgO underlayer, the FePt alloys is able to adopt a (001) orientation.

In those cases where the magnetic layer has a granular structure composed of magnetic crystal grains and a grain boundary phase, increasing the amount of the oxide that constitutes the grain boundary phase enables the magnetic grain size to be reduced to 6 nm or less.

However, in such cases, the grain size of the MgO underlayer is constant. Consequently, a plurality of magnetic crystal grains grow on the same underlayer. The exchange coupling between magnetic grains formed on the same underlayer is more powerful than the exchange coupling between magnetic grains formed on different underlayers. Accordingly, even if the magnetic crystal grains are reduced in size by increasing the amount of oxide, the magnetic cluster size cannot be reduced. In order to achieve a reduction in the medium noise to realize increased recording density, a reduction in the magnetic cluster size is essential.

Further, when a plurality of magnetic crystal grains are grown on a single underlayer crystal grain, the grain size distribution tends to increase. If the grain size distribution increases, then the medium noise also increases, making it difficult to achieve a high recording density. Accordingly, in order to reduce the cluster size and achieve a more uniform magnetic grain size, it is necessary to reduce the grain size of the underlayer to substantially the same size as that of the magnetic layer grain size, so that a single magnetic crystal grain can be grown on each underlayer crystal grain. An MgO underlayer is usually formed on a glass substrate, either directly or on top of a Ta layer or CrRu alloy layer. In either case, reducing the grain size of the MgO underlayer to 6 nm or less is problematic. In order to enable formation of magnetically isolated magnetic crystal grains of 6 nm or smaller, not only the crystal grains of the magnetic layer, but also the crystal grains of the underlayer must be reduced in size to approximately 6 nm.

Means to Solve the Problems

In order to address the issues outlined above, the present invention provides a heat-assisted magnetic recording medium that includes a substrate, underlayers formed on the substrate, and a magnetic layer which is formed on the underlayers and contains either an FePt alloy having an $L1_0$ structure or a CoPt alloy having an $L1_0$ structure as the main component, wherein the underlayers are composed of a first underlayer formed from an amorphous alloy, a second underlayer formed from an alloy having a BCC structure containing Cr as the main component and also containing at least one element selected from among Ti, Mo, W, V, Mn and Ru, and a third underlayer formed from MgO.

By adding an element such as Ti, Mo, W, V, Mn or Ru to a Cr underlayer, the grain size of the underlayer can be reduced to 6 nm or less. As a result, the grain size of the MgO underlayer (third underlayer) formed on top of this Cr alloy underlayer (second underlayer) can also be reduced. This is because the MgO underlayer is grown epitaxially on top of the Cr alloy underlayer. When the magnetic layer is formed on top of this MgO underlayer in which the grain size has been reduced to 6 nm or less, a single magnetic crystal grain is able to be grown on each MgO crystal grain. As a result, magnetic crystal grains of small uniform grain size that have a high degree of magnetic isolation can be formed. By also adding B, Si or C to the Cr alloy underlayer, the grain size of the Cr alloy underlayer can be further reduced and made more uniform. This enables further grain size reduction and improved uniformity for the magnetic crystal grains having a high degree of magnetic isolation. Although there are no particular limitations on the alloy composition of the Cr alloy underlayer, the alloy preferably includes 2 to 50 at %, and more preferably 10 to 35 at %, of the elements Ti, Mo, W, V, Mn, Ru, B, Si and C relative to the amount of Cr.

In order to enable the magnetic crystal grains to adopt a highly ordered $L1_0$ structure, the magnetic layer is preferably deposited at a substrate temperature of at least 350 to 400° C. In such a case, the magnetic layer must be formed on a chemically stable MgO underlayer. If the magnetic layer is formed directly on top of the Cr alloy underlayer, then the elements within the underlayer diffuse into the magnetic layer, causing an undesirable reduction in the Ku value. However, in those cases where, by adding an element such as Ag or Cu to the magnetic layer, the $L1_0$ structure ordering temperature can be reduced to a temperature (typically less than 350° C.) at which diffusion from the Cr alloy underlayer into the magnetic layer does not occur, the MgO underlayer may be omitted.

In order to obtain a magnetic recording medium having a high level of perpendicular magnetic anisotropy, the $L1_0$ structure FePt alloy or CoPt alloy used for the magnetic layer must adopt the (001) orientation. In order to ensure that the magnetic layer adopts this orientation, the Cr alloy underlayer having a BCC structure must adopt the (100) orientation. By forming the MgO underlayer on top of the (100) oriented Cr alloy underlayer, the MgO layer also adopts the (100) orientation. By subsequently forming the $L1_0$ structure magnetic layer on top of this MgO layer, the magnetic layer is able to be formed with the (001) orientation.

In order to make the Cr alloy underlayer adopt a (001) orientation, the underlayer is preferably formed on an underlayer having an amorphous structure (the first underlayer) at a high temperature of approximately 150° C. or higher. Hereinafter, the first underlayer having an amorphous structure is frequently referred to as the seed layer.

The seed layer may use an amorphous alloy containing Ni and at least one element selected from among Ta, Nb, Ti, Zr, Hf, W, Mo, B, Si and C. An amorphous alloy containing Co and one element selected from among Ta, Nb, Ti, Zr, Hf, W, Mo, B, Si and C may also be used. Although there are no particular limitations on the amorphous alloy composition of the seed layer, the layer preferably contains from 5 to 60 at %, and more preferably 20 to 50 at %, of the elements Ta, Nb, Ti, Zr, Hf, W, Mo, B, Si and C relative to the amount of Ni or Co. Because the alloy contains a magnetic element, Cr, V or Mn or the like may also be added to demagnetize the layer. The seed layer is preferably nonmagnetic, although provided there are no significant effects on the recording and reproduction characteristics, no particular problems arise if the layer has a weak magnetization of 100 emu/cc or less.

Moreover, an amorphous alloy containing Cr and at least one element selected from among Ta, Nb, Ti, Zr, Hf, B, Si and C, or an amorphous alloy containing Cu and at least one element selected from among Ta, Nb, Ti, Zr, Hf, B, Si and C may also be used as the seed layer. There are no particular limitations on the alloy composition, provided the composition yields an amorphous structure, but the layer preferably contains from 5 to 60 at %, and more preferably 20 to 55 at %, of the elements Ta, Nb, Ti, Zr, Hf, B, Si and C relative to the amount of Cr or Cu.

Furthermore, an amorphous alloy seed layer containing at least one element selected from among Pd, Mo, W, Ti, Zr, Mn, Ta and Nb, and at least one element selected from among Si, B and C may also be used. Although there are no particular limitations on the amorphous alloy composition of this seed layer, the layer preferably contains from 5 to 60 at %, and more preferably from 10 to 50 at % of the elements Pd, Mo, W, Ti, Zr, Mn, Ta, Nb, Si, B and C relative to the amount of Pd, Mo, W, Ti, Zr, Mn, Ta or Nb.

There are no particular limitations on the thickness of the seed layer, provided the thickness is less than the thickness at which crystallization occurs, but in consideration of throughput, the thickness is preferably not more than 50 nm. However, the thickness may be increased to approximately 100 to 200 nm to impart the seed layer with the functionality of a heat sink layer.

A heat sink layer may be formed between the seed layer (first underlayer) and the substrate. A material having a high thermal conductivity such as Cu, Ag, Al, or an alloy thereof is preferred as the heat sink layer. The heat sink layer typically adopts an FCC (111) orientation, but by forming an amorphous structure seed layer on top of the heat sink layer, the Cr alloy underlayer formed on top of the seed layer is able to adopt a (100) orientation.

Further, even in those cases where the grain size of the heat sink layer is large, provided the Cr alloy underlayer is formed on the amorphous seed layer, the grain size of the Cr alloy underlayer can be reduced.

When Ag is used for the heat sink layer, an MgO layer may be formed on the substrate as an orientation control layer for the heat sink layer, with the Ag heat sink layer then formed on top of this MgO layer. In this case, because the Ag layer adopts a (100) orientation, the Cr alloy underlayer (second underlayer) can be imparted with an even stronger (100) orientation. As a result, the $L1_0$ structure magnetic layer can also be imparted with a stronger (001) orientation.

Further, in order to improve the write characteristics, a soft magnetic underlayer (SUL) may also be introduced. Examples of materials that may be used for this soft magnetic underlayer include soft magnetic alloys such as FeTaC alloys, CoTaZr alloys, CoNbZr alloys, CoFeTaB alloys and CoFeTaSi alloys, which have undergone antiferromagnetic coupling via Ru.

In addition, a plurality of other underlayers may also be introduced for purposes such as improving adhesion and improving mechanical properties.

As described above, an FePt alloy having an $L1_0$ structure or a CoPt alloy having an $L1_0$ structure, which exhibits a high Ku value, is preferably used for the magnetic layer. In order to achieve reduced exchange coupling and favorable grain size reduction, the magnetic layer preferably has a granular structure in which the magnetic crystal grains are divided by a grain boundary phase of $SiO_2$ or the like. Examples of materials other than $SiO_2$ that may be used for the grain boundary phase include $TiO_2$, $Al_2O_3$, $Ta_2O_5$, $ZrO_2$, MnO, TiO, ZnO, or mixtures of these oxides. Furthermore, C may also be used. In order to reduce the Curie temperature of the magnetic crystal grains, Ni may be added to the FePt alloy or CoPt alloy. Moreover, Cu or Ag or the like may be added to reduce the ordering temperature. There are no particular limitations on the amounts added of Ni, Cu and Ag and the like, provided there is no significant deterioration in the $L1_0$ structure.

Further, the magnetic cluster size within the magnetic layer is preferably not more than 50 nm, and more preferably 25 nm or less.

The grain size distribution within the magnetic layer is preferably not more than 30%, and more preferably 20% or less.

The crystal grains within the magnetic layer preferably adopt the $L1_0$ structure, but a small amount of crystal grains having an FCC structure may also be mixed within the crystal grains provided that the Ku value does not decrease significantly. In order to achieve a high Ku value, the ratio between the integrated intensity of the $L1_0$-FePt (001) peak and the integrated intensity of the mixed peak composed of the $L1_0$-FePt (002) peak and the FCC-FePt (200) peak is preferably at least 2.

Furthermore, the present invention also provides a magnetic storage device including a magnetic recording medium, a medium drive unit for rotating the magnetic recording medium, a laser generation unit for heating the magnetic recording medium, a magnetic head equipped with a waveguide that guides the laser light generated by the laser generation unit to the tip of the head, a head drive unit for moving the magnetic head, and a recording and reproduction signal processing system, wherein the magnetic recording medium is the heat-assisted magnetic recording medium described above.

Effect of the Invention

The present invention is able to reduce exchange coupling between magnetic grains and reduce the magnetic cluster size to realize a heat-assisted magnetic recording medium having a surface recording density at the 1 Tbit/inch$^2$ level, and also provides a magnetic storage device that uses this heat-assisted magnetic recording medium.

BEST MODE FOR CARRYING OUT THE INVENTION

Embodiments for carrying out the present invention are described below using a series of examples.

EXAMPLES

Examples 1-1 to 1-10, and Comparative Example 1

Figure 1:
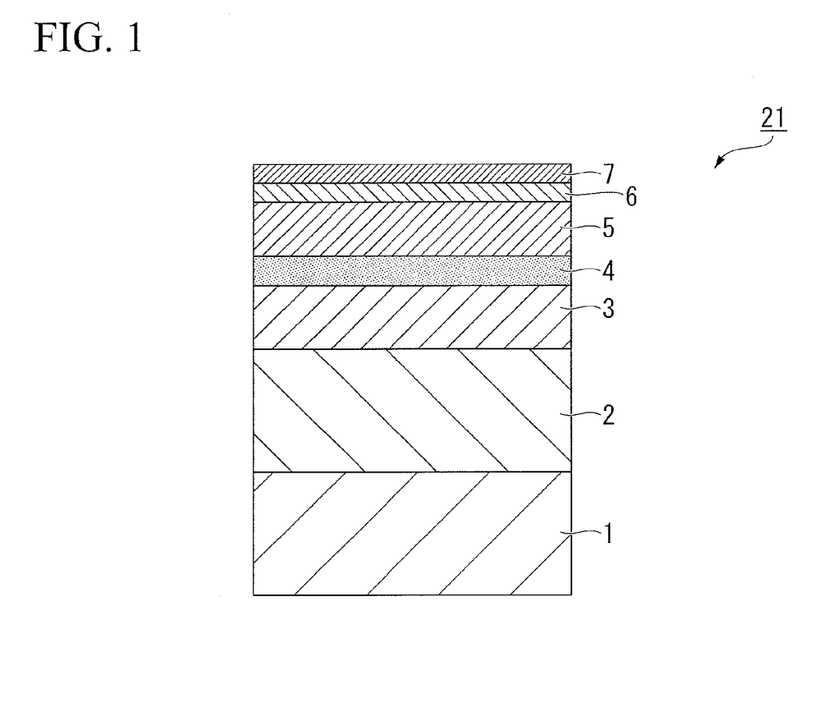
FIG. 1 is a schematic cross-sectional view illustrating one example of a magnetic recording medium of the present invention.

FIG. 1 illustrates one example of the layer structure of a magnetic recording medium prepared in these examples of the present invention.

A 100 nm Cr-50 at % Ti underlayer (first underlayer) 2 was formed on a glass substrate (the substrate) 1, and following heating to 380° C. using a lamp heater, a Cr alloy underlayer (second underlayer) 3 of 12 nm was formed. Subsequently, a 2 nm MgO underlayer (third underlayer) 4, a 12 nm 92 mol % (Fe-50 at % Pt-15 at % Ni)-8 mol % ($SiO_2$) magnetic layer 5, and a 3 nm carbon protective film 6 were formed in a continuous manner within a vacuum deposition apparatus. Following removal from the vacuum apparatus, a lubricant film 7 of 1.7 nm was applied to each magnetic recording medium prior to evaluation of the recording and reproduction characteristics.

In the above production process, by altering the material used for the Cr alloy underlayer (second underlayer) 3 as shown in Table 1, magnetic recording media of Examples 1-1 to 1-10 were produced.

Further, a magnetic recording medium of Comparative Example 1 was produced by the same process, but using a 12 nm Cr layer as the second underlayer 3.

TABLE 1

| | Second underlayer (Cr alloy underlayer: 12 nm) | Average grain size of magnetic layer (nm) | Hc/Hk of magnetic recording medium |
|---|---|---|---|
| Example 1-1 | Cr—15at%Ti—5at%B | 5.8 | 0.35 |
| Example 1-2 | Cr—10at%Ti—10at%C | 5.7 | 0.32 |
| Example 1-3 | Cr—20at%Mo—10at%B | 5.5 | 0.33 |
| Example 1-4 | Cr—20at%Mo—5at%Si | 5.3 | 0.36 |
| Example 1-5 | Cr—20at%W—7at%B | 5.9 | 0.33 |
| Example 1-6 | Cr—20at%W—7at%Si | 5.6 | 0.28 |
| Example 1-7 | Cr—10at%V—5at%C | 5.4 | 0.31 |
| Example 1-8 | Cr—12at%Mn—2at%B | 6.1 | 0.30 |
| Example 1-9 | Cr—20at%Mn—2at%C | 6.0 | 0.32 |
| Example 1-10 | Cr—8at%Ru—10at%B | 6.1 | 0.31 |
| Comparative example 1 | Cr | 5.7 | 0.21 |

Figure 2:
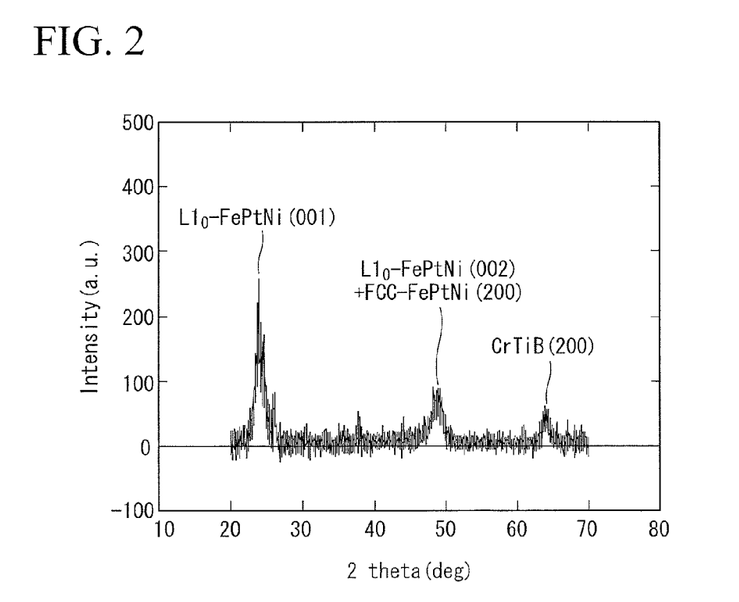
FIG. 2 is a diagram illustrating one example of an X-ray diffraction spectrum of a magnetic recording medium of the present invention.

An X-ray diffraction spectrum of a medium of one of the present examples (Example 1-1) that used a Cr-15 at % Ti-5 at % B alloy as the Cr alloy underlayer 3 is shown in FIG. 2.

It is thought that the fact that a clear diffraction peak was not observed for the 100 nm CrTi seed layer indicates that the CrTi seed layer 2 has an amorphous structure. Only a CrTiB (200) peak was observed for the Cr alloy underlayer 3, confirming that the CrTiB alloy layer 3 formed on top of the amorphous CrTi seed layer 2 had adopted a favorable (100) orientation. An $L1_0$-FePtNi (001) peak, and a mixed peak composed of an $L1_0$-FePtNi (002) peak and an FCC-FePtNi (200) peak were observed for the magnetic layer 5.

The integrated intensity ratio of the former peak relative to the latter mixed peak was at least 2.2. This indicates that an $L1_0$-FePtNi alloy with a high degree of ordering had been formed. The MgO underlayer 4 is very thin and composed of small crystal grains, and therefore no clear diffraction peak was observed. However, based on the fact that the magnetic layer 5 had the orientation described above, it is assumed that the MgO underlayer 4 had grown epitaxially on top of the CrTiB underlayer 3 and had adopted the (100) orientation.

Based on the above results, it was evident that the FePtNi alloy within the magnetic layer 5 of the media of the present examples had adopted an $L1_0$ structure with a high degree of ordering, and also had an (001) orientation.

When planar TEM observations of the magnetic layer 5 of the media of the present examples were performed, a granular structure in which the crystal grains were surrounded by an amorphous phase was observed in each case. Table 1 shows the average grain size within the FePt magnetic layer 5 estimated on the basis of this planar TEM observation. The average grain size of the magnetic layer 5 for the media of the present examples was approximately 5.5 to 6 nm.

Further, performing cross-sectional TEM observations confirmed that continuous columnar growth had occurred from the Cr alloy underlayer 3 through to the FePt magnetic layer 5. This indicates that a single magnetic crystal grain had grown on a single crystal grain of the MgO underlayer, which in turn had grown on a single crystal of the Cr alloy underlayer.

Table 1 also shows the ratio Hc/Hk between the coercive force Hc and the anisotropic magnetic field Hk for the media of the examples of the present invention. These values Hc/Hk for the media of the present examples were comparatively high values within a range from approximately 0.28 to 0.36. These results indicate that the exchange coupling between magnetic grains had been reduced. The anisotropic magnetic field Hk was determined by a torque measurement at a maximum applied magnetic field of 40 kOe.

On the other hand, as shown in Table 1, the average grain size for the magnetic layer 5 of the medium of the comparative example was 5.7 nm, which is substantially equal to the values observed for the media of the examples. However, when a cross-sectional TEM observation was performed, the grain size of the Cr underlayer of the medium of the comparative example was an extremely large value of at least 30 nm, and a plurality of magnetic crystal grains had grown on each grain of the underlayer. Further, the Hc/Hk value for the medium of the comparative example was markedly lower than the values observed for the media of the examples. This indicates that the medium of the comparative example has considerably stronger exchange coupling between the magnetic grains than the media of the examples.

Based on the above results it was evident that by forming a Cr alloy having a composition shown in Table 1 as an underlayer on top of a CrTi seed layer 2 having an amorphous structure, a heat-assisted magnetic recording medium having a magnetic layer with very fine crystal grains and a high degree of magnetic isolation was able to be obtained.

The grain size of the underlayer can be further reduced by altering the underlayer composition. For example, the average grain size of a Cr-15 at % Ti-10 at % B underlayer 3 in which the B concentration had been increased to 10 at % was 4.8 nm. Further, the average grain size of the magnetic layer 5 can also be further reduced by increasing the $SiO_2$ concentration within the magnetic layer. By combining these techniques and optimizing the respective compositions, a heat-assisted magnetic recording medium having a magnetic layer 5 with even finer crystal grains and a higher degree of magnetic isolation can be obtained.

Further, although omitted in the present examples, a heat sink layer composed of Cu, Ag, Al, or an alloy thereof may also be introduced. The heat sink layer is preferably introduced beneath the amorphous seed layer 2 (namely, on the substrate-side of the seed layer). In those cases where the heat sink layer is formed directly on the substrate, the layer adopts an FCC (111) orientation. However, by forming the amorphous seed layer 2 on top of this heat sink layer, the Cr alloy underlayer 3 formed on top of the seed layer 2 can still adopt a (100) orientation. The Cr alloy underlayer 3 preferably adopts a (100) orientation, although there are no particular problems if the underlayer 3 also includes a small amount of (110) oriented crystal grains, provided the (100) orientation of the MgO underlayer 4 is not significantly destroyed.

Examples 2-1 to 2-16, and Comparative Example 2

Figure 3:
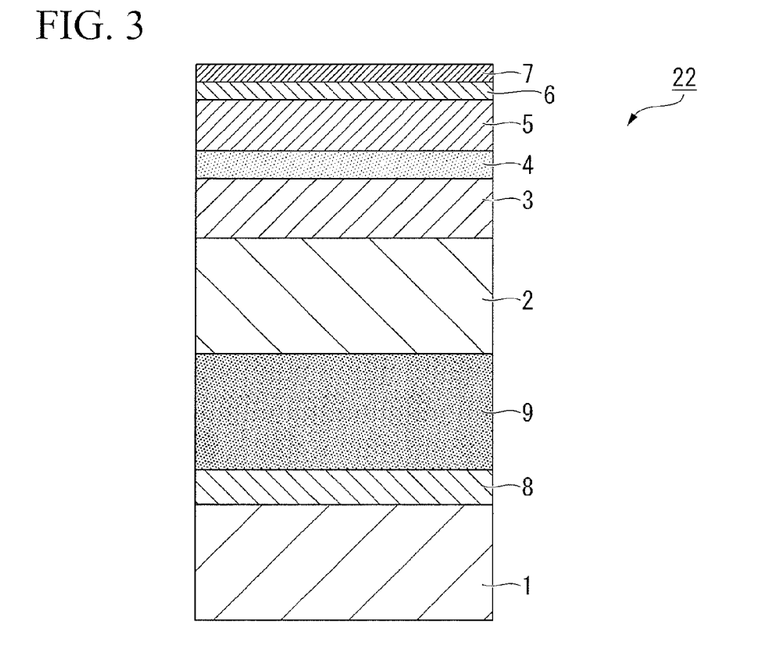
FIG. 3 is a schematic cross-sectional view illustrating another example of a magnetic recording medium of the present invention.

FIG. 3 illustrates one example of the layer structure of a magnetic recording medium prepared in these examples of the present invention.

A 10 nm MgO underlayer 8 and a 200 nm Ag heat sink layer 9 were formed on a glass substrate (the substrate) 1, and a seed layer (first underlayer) 2 of 20 nm was then formed. Subsequently, the substrate 1 was heated to 420° C., and an 8 nm Cr-20 at % Mo-10 at % B underlayer (second underlayer) 3, a 5 nm MgO underlayer (third underlayer) 4, a 10 nm 90 mol % (Fe-45at % Pt)-10 mol % ($TiO_2$) magnetic layer 5, and a carbon protective film 6 were formed. A lubricant film 7 of 1.7 nm was applied to each magnetic recording medium prior to evaluation of the recording and reproduction characteristics.

In the above production process, by altering the material used for the seed layer (first underlayer) 2 as shown in Table 2, magnetic recording media of Examples 2-1 to 2-16 were produced.

Further, a magnetic recording medium of Comparative Example 2 was produced by forming the MgO underlayer (third underlayer) 4 directly on the Ag heat sink layer 9, without forming the first underlayer 2 or the second underlayer 3.

TABLE 2

| | First underlayer (Seed layer: 20 nm) | Average grain size of magnetic layer (nm) | Hc/Hk of magnetic recording medium |
|---|---|---|---|
| Example 2-1 | Ni—40at%Ta | 5.2 | 0.36 |
| Example 2-2 | Ni—50at%Ti | 4.9 | 0.35 |
| Example 2-3 | Ni—45at%Zr | 5.4 | 0.37 |
| Example 2-4 | Ni—30at%Mo—10at%B | 5.5 | 0.35 |
| Example 2-5 | Ni—35at%W—10at%C | 5.1 | 0.36 |
| Example 2-6 | Ni—30at%Si | 4.8 | 0.36 |
| Example 2-7 | Co—40at%Ta—2at%B | 5.2 | 0.35 |
| Example 2-8 | Co—40at%Ti | 5.0 | 0.38 |
| Example 2-9 | Co—30at%Cr—10at%Zr | 5.4 | 0.40 |
| Example 2-10 | Co—20at%Zr—20at%V | 5.3 | 0.35 |
| Example 2-11 | Co—20at%V—10at%Hf | 4.9 | 0.36 |
| Example 2-12 | Co—20at%Mn—5at%Si | 5.1 | 0.34 |
| Example 2-13 | Cr—50at%Ta | 4.9 | 0.38 |
| Example 2-14 | Cr—50at%Zr—5at%Si | 5.6 | 0.37 |
| Example 2-15 | Cu—20at%Zr | 5.4 | 0.35 |
| Example 2-16 | Cu—20at%Ti—5at%B | 5.1 | 0.34 |
| Comparative example 2 | — | 5.0 | 0.22 |

X-ray diffraction measurements of the media of the present examples revealed a strong Ag (200) peak from the Ag heat sink layer 9. Further, an $L1_0$-FePt (001) peak, and a mixed peak composed of an $L1_0$-FePt (002) peak and an FCC-Fe (200) peak were observed for the FePt magnetic layer 5.

The integrated intensity ratio of the former peak relative to the latter mixed peak was at least 2.2, indicating that an $L1_0$-FePt alloy with a high degree of ordering had been formed. Although no clear diffraction peaks were observed for the CrMoB underlayer 3 or the MgO underlayer 4, based on the fact that the magnetic layer 5 had the orientation described above, it is assumed that these underlayers had adopted a BCC (100) orientation and an NaCl (100) orientation respectively. Further, it is thought that the fact that a clear diffraction peak was also not observed for the seed layer 2 indicates that the seed layer 2 used in the present examples had an amorphous structure in each case.

Table 2 shows the average grain size and the Hc/Hk ratio for the magnetic layer within each of the media of the present examples and the medium of the comparative example.

In both the media of the present examples and the medium of the comparative example, the average grain size of the magnetic layer 5 was approximately 5 to 5.5 nm. However, the Hc/Hk values were significantly higher for the media of the examples, confirming that the amount of exchange coupling had been reduced. Cross-sectional TEM observation of the media of the examples revealed that the grain size within the Ag heat sink layer 9 was an extremely large value of at least 20 to 30 nm, but the CrMoB underlayer 3, which was formed on top of the heat sink layer with the amorphous layer disposed therebetween, had a columnar structure with a grain size of 5 to 6 nm, and the MgO underlayer 4 and the magnetic layer 5 had been grown in a continuous manner on top of the CrMoB underlayer 3.

On the other hand, performing a cross-sectional TEM observation of the medium of the comparative example revealed that the grain size of the MgO underlayer 4 formed on top of the Ag heat sink layer 9 was substantially the same as that of the Ag heat sink layer 9, and was approximately 20 to 30 nm. Further, a plurality of crystal grains had grown in a columnar manner on top of each crystal grain of the MgO underlayer. Accordingly, it is thought that the reason for the strong exchange coupling within the medium of the comparative example was due to the fact that a plurality of magnetic crystal grains had grown on each crystal grain of the MgO underlayer.

Based on the above results it was evident that by forming the CrMoB alloy underlayer 3 on top of an amorphous seed layer 2 having a composition shown in Table 2, a heat-assisted magnetic recording medium having a magnetic layer 5 with very fine crystal grains and a high degree of magnetic isolation was able to be obtained.

Besides the alloys shown in Table 2, other alloys having an amorphous structure such as CrNb, CrTi, CrHf, CrB, CrSi and CrC may also be used for the seed layer 2. There are no particular limitations on the layer composition, provided an amorphous structure is formed.

Further, besides the $L1_0$-FePt alloy described above, a CoPt alloy having an $L1_0$ structure may also be used for the magnetic layer 5. Furthermore, examples of oxides that may be used for the grain boundary phase of the magnetic layer 5, besides $SiO_2$, include $TiO_2$, $Al_2O_3$, $Ta_2O_5$, $ZrO_2$, MnO, TiO, ZnO, or mixtures thereof. Further, Ni may be added to the magnetic layer 5 to reduce the Curie temperature. Moreover, Cu or Ag or the like may be added to reduce the ordering temperature. There are no particular limitations on the amount added of Ni, Cu or Ag or the like, provided there is no significant deterioration in the $L1_0$ structure.

Examples 3-1 to 3-12, and Comparative Example 3

Figure 4:
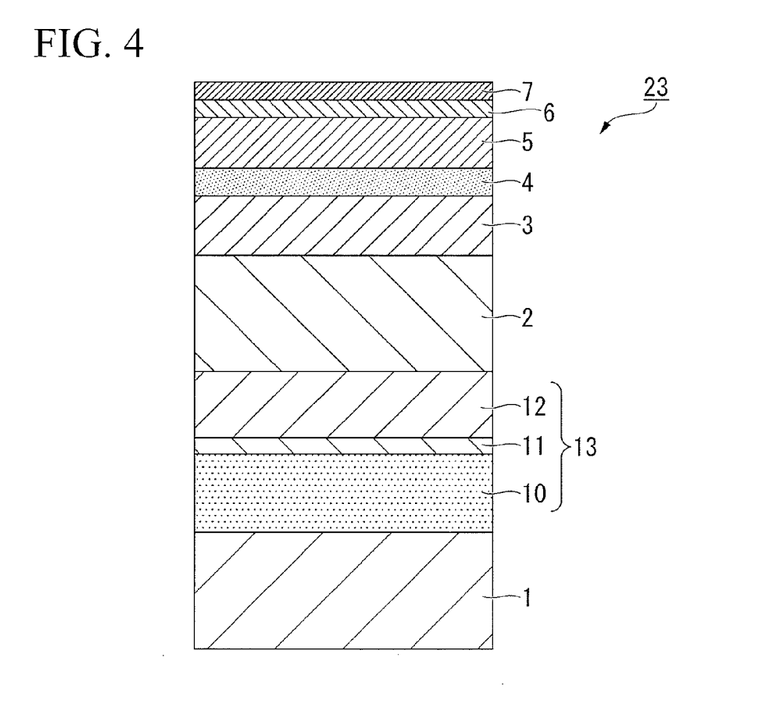
FIG. 4 is a schematic cross-sectional view illustrating yet another example of a magnetic recording medium of the present invention.

FIG. 4 illustrates one example of the layer structure of a magnetic recording medium prepared in these examples of the present invention.

A soft magnetic underlayer (SUL) 13 having a total thickness of 50 nm and composed of a Ru layer 11 sandwiched between two layers 10 and 12 of an Fe-30 at % Co-3 at % Ta-1 at % Si-1 at % B alloy was formed on top of an amorphous substrate (the substrate) 1. Subsequently, a 20 nm amorphous seed layer (first underlayer) 2 was formed, and following heating of the substrate to 350° C., a 10 nm Cr alloy underlayer (second underlayer) 3 was formed. Following formation of the Cr alloy underlayer 3, a 5 nm MgO underlayer (third underlayer) 4 and a 6 nm Fe-30 at % Pt-10 at % Ni-30 at % C magnetic layer 5 were formed. Following formation of the magnetic layer 5, a 3 nm carbon protective film 6 was formed, and a lubricant film 7 was applied.

In the above production process, by altering the materials used for the seed layer (first underlayer) 2 and the Cr alloy underlayer (second underlayer) 3 as shown in Table 3, magnetic recording media of Examples 3-1 to 3-12 were produced.

Further, a magnetic recording medium of Comparative Example 3 was produced using the same process as the examples, but without providing the seed layer 2 and the Cr alloy underlayer 3.

TABLE 3

| | First underlayer (Seed layer: 20 nm) | Second underlayer (Cr alloy underlayer: 10 nm) | Average grain size of magnetic layer (nm) | Magnetic cluster size of magnetic layer (nm) |
|---|---|---|---|---|
| Example 3-1 | Pd—20at%Si | Cr—25at%Ti—5at%Mo | 5.2 | 12 |
| Example 3-2 | Mo—18at%Si—2at%C | Cr—10at%Ti—10at%Si | 4.9 | 15 |
| Example 3-3 | Mo—35at%Zr | Cr—30at%Mo | 5.4 | 14 |
| Example 3-4 | W—10at%Si—2at%B | Cr—30at%Mo—5at%C | 5.5 | 21 |
| Example 3-5 | Ti—25at%Si | Cr—20at%W—3at%C | 5.1 | 14 |
| Example 3-6 | Ti—50at%Zr | Cr—20at%V—5at%B | 4.8 | 16 |
| Example 3-7 | Zr—15at%Si—3at%C | Cr—15at%V—5at%Si | 5.2 | 13 |
| Example 3-8 | Mn—10at%Si | Cr—30at%Mn | 5.4 | 15 |
| Example 3-9 | Ta—15at%Si | Cr—25at%Mn—5at%Si | 5.1 | 14 |
| Example 3-10 | Ta—10at%Zr—5at%B | Cr—25at%Ru—5at%Si | 5.0 | 17 |
| Example 3-11 | Nb—22at%Si | Cr—22at%Ru—5at%C | 4.8 | 20 |
| Example 3-12 | Nb—10at%B | Cr—15at%Ru—8at%B | 4.9 | 19 |
| Comparative example 3 | — | — | 5.1 | 42 |

In order to determine the crystal structure of the seed layer 2, a sample was prepared up to and including the seed layer 2, and when this sample was measured by X-ray diffraction, only a halo pattern was observed. Accordingly, it is thought that the seed layer 2 used in each of the present examples had an amorphous crystal structure.

Further, in order to determine the crystal orientation of the Cr alloy underlayer 3, a sample having a thicker underlayer of 20 nm was prepared using the same process as that described above. When an X-ray diffraction measurement was performed, only a BCC (200) peak was observed from the underlayer. Accordingly, it was evident that in each of the present examples, the Cr alloy underlayer 3 formed on the aforementioned amorphous seed layer 2 had adopted a (100) orientation.

Furthermore, an $L1_0$-FePt (001) peak and a mixed peak composed of an $L1_0$-FePt (002) peak and an FCC-Fe (200) peak were observed for the FePt magnetic layer 5.

The integrated intensity ratio of the former peak relative to the latter mixed peak was at least 2.4, confirming that an $L1_0$-FePt alloy with a high degree of ordering had been formed.

Table 3 shows the average grain size and the cluster size within the magnetic layer 5 for the media of the present examples and the medium of the comparative example. The thickness of the Cr alloy underlayer 3 within each of the media of the examples was 10 nm. Further, the cluster size is defined as the half width of the autocorrelation function estimated from the MFM image of the AC-demagnetized medium. This is the same technique as that disclosed, for example, in IEEE Trans. Magn., vol. 39, pp. 2094 to 2096. The average grain size for the magnetic layer within the media of the present examples was approximately 5 to 5.5 nm. The cluster size was 15 to 20 nm.

On the other hand, the average grain size of the magnetic layer 5 within the medium of the comparative example, at 5.1 nm, was substantially the same as that observed in the media of the examples, but the cluster size, at 42 nm, was markedly larger than that observed in the example media. This indicates that the exchange coupling was considerably stronger in the medium of the comparative example.

Based on the above results, it was evident that by providing the Cr alloy underlayer 3 on an amorphous seed layer 2 shown in Table 3, exchange coupling could be reduced, enabling a reduction in the cluster size.

Besides the alloys shown above, other alloys having an amorphous structure such as CuTa, CuNb, CuHf, CuSi and CuC may also be used for the seed layer 2. There are no particular limitations on the layer composition or the layer thickness, provided an amorphous structure is formed. Further, as the SUL material, besides the alloys listed above, FeCoTaSi alloys, FeCoTaB alloys, FeCoZrSi alloys, FeCoZrB alloys and FeCoSiB alloys and the like may also be used.

Examples 4-1 to 4-11, and Comparative Example 4

Figure 5:
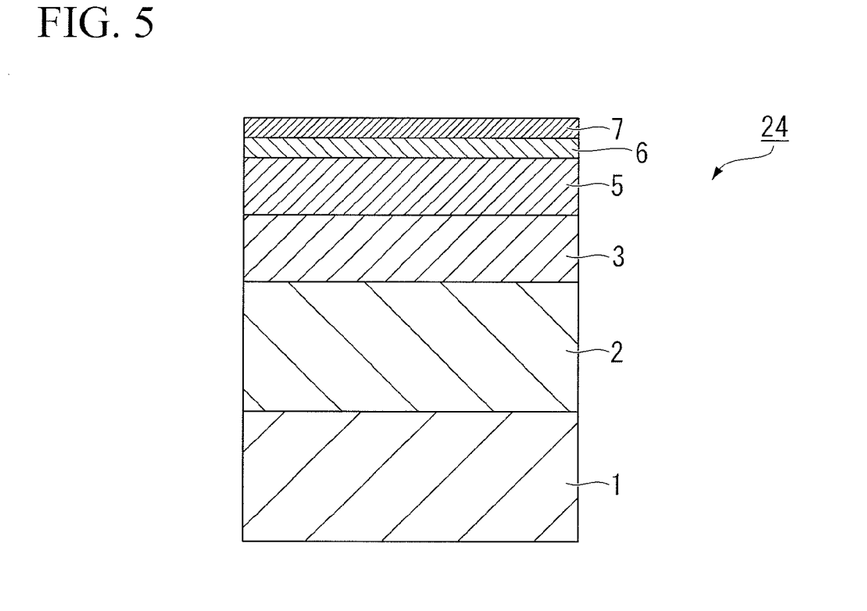
FIG. 5 is a schematic cross-sectional view illustrating yet another example of a magnetic recording medium of the present invention.

FIG. 5 illustrates one example of the layer structure of a magnetic recording medium prepared in these examples of the present invention.

Following formation of a 200 nm Ni-50 at % Ti seed layer (first underlayer) 2 on top of a glass substrate (the substrate) 1, a 10 nm underlayer (second underlayer) 3 was formed using the various Cr alloys shown in Table 4. Subsequently, the substrate was heated to 330° C., and a 10 nm 91 mol % (Fe-40 at % Pt-15 at % Cu)-9 mol % ($TiO_2$) magnetic layer 5, and a carbon protective film 6 were formed. Following formation of the carbon protective film 6, a 2 nm lubricant film 7 was applied.

In the above production process, by altering the material used for the Cr alloy underlayer (second underlayer) 3 as shown in Table 4, magnetic recording media of Examples 4-1 to 4-11 were produced.

Further, a magnetic recording medium of Comparative Example 4 was produced using the same process conditions as the examples, but using a Cr underlayer.

TABLE 4

| | Second underlayer (Cr alloy underlayer) | Average grain size (nm) | Grain size distribution (%) | Cluster size (nm) |
|---|---|---|---|---|
| Example 4-1 | Cr—15at%Ti | 5.6 | 17.7 | 22 |
| Example 4-2 | Cr—10at%Ti—3at%Si | 5.9 | 18.2 | 20 |
| Example 4-3 | Cr—7at%Mo—5at%C | 5.8 | 16.0 | 19 |
| Example 4-4 | Cr—30at%W | 5.5 | 19.7 | 24 |
| Example 4-5 | Cr—12at%W—2at%C | 5.6 | 20.0 | 17 |
| Example 4-6 | Cr—14at%V | 6.0 | 19.1 | 18 |
| Example 4-7 | Cr—12at%V—8at%B | 5.7 | 15.4 | 23 |
| Example 4-8 | Cr—15at%V—2at%Si | 5.5 | 17.9 | 24 |
| Example 4-9 | Cr—20at%Mn—3at%Si | 6.0 | 18.8 | 21 |

TABLE 4-continued

|  | Second underlayer (Cr alloy underlayer) | Average grain size (nm) | Grain size distribution (%) | Cluster size (nm) |
|---|---|---|---|---|
| Example 4-10 | Cr—20at%Ru—5at%C | 5.9 | 19.1 | 16 |
| Example 4-11 | Cr—15at%Ru—4at%Si | 5.7 | 16.6 | 19 |
| Comparative example 4 | Cr | 5.9 | 31.1 | 55 |

When X-ray diffraction measurements were performed on the media of the present examples, an $L1_0$-FePtCu (001) peak, and a mixed peak composed of an $L1_0$-FePtCu (002) peak and an FCC-FePtCu (200) peak were observed from the magnetic layer 5.

The integrated intensity ratio of the former peak relative to the latter mixed peak was 2, indicating that an $L1_0$-FePtCu alloy with a high degree of ordering had been formed. Because the magnetic layer 5 within the media of the present examples contained Cu, the ordering temperature was low. As a result, magnetic recording media having a magnetic layer with a high degree of ordering were able to be obtained even if the substrate is heated at the comparatively low substrate of 330° C.

Further, because the heating temperature was a comparatively low temperature of 330° C., interface diffusion does not occur even if the magnetic layer 5 is formed directly on top of the Cr alloy underlayer 3. As a result, an MgO layer (third underlayer) 4 need not be formed between the Cr alloy underlayer 3 and the magnetic layer 5.

Table 4 shows the average grain size, the cluster size and the grain size distribution for the magnetic layer 5, which were evaluated using the same techniques as those described above for Examples 3-1 to 3-12. The average grain size for the magnetic layer 5 within the media of the present examples was 5.5 to 6 nm, and the cluster size was 15 to 25 nm.

On the other hand, the average grain size within the medium of the comparative example, at 5.9 nm, was substantially the same as that observed in the media of the examples, but the cluster size, at 55 nm, was markedly larger than that observed in the media of the examples.

Based on the above results, it was evident that the exchange coupling between magnetic grains had been reduced in the media of the present examples. Further, the grain size distribution was 20% or less in each of the media of the examples, confirming that the magnetic grain size was more uniform than in the medium of the comparative example.

Besides the material described above, materials composed of an FePtAg alloy prepared by adding Ag to an FePt alloy, and $SiO_2$, $TiO_2$, $Al_2O_3$, $Ta_2O_5$, $ZrO_2$, MnO, TiO, ZnO, C, or a mixture thereof may also be used for the magnetic layer 5. In a similar manner to that observed when Cu is added, adding Ag to an FePt alloy is able to reduce the ordering temperature, and therefore the substrate heating temperature can be suppressed to less than 350° C. In such cases, the MgO layer 4 need not be provided.

Example 5

Figure 6:
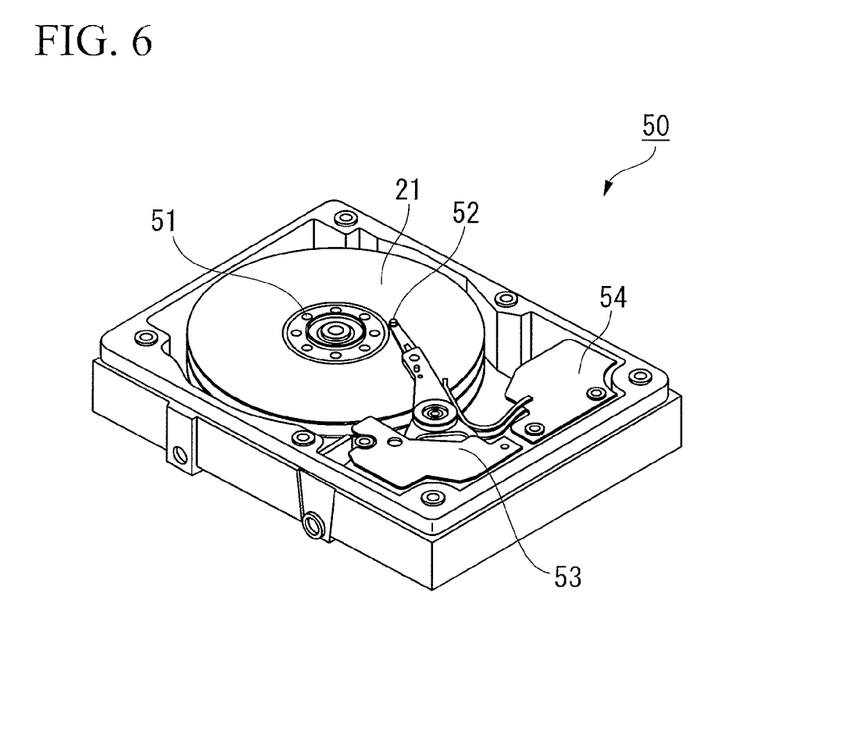
FIG. 6 is a perspective view illustrating one example of a magnetic storage device of the present invention.

The magnetic recording media 21 to 24 described in the above examples were installed within a magnetic storage device illustrated in FIG. 6.

As illustrated in FIG. 6, the magnetic storage device 50 of the present invention includes, for example, the magnetic recording medium 21, a medium drive unit 51 for rotating the magnetic recording medium 21, a magnetic head 52, a head drive unit 53 for moving the magnetic head 52, and a recording and reproduction signal processing system 54.

Figure 7:
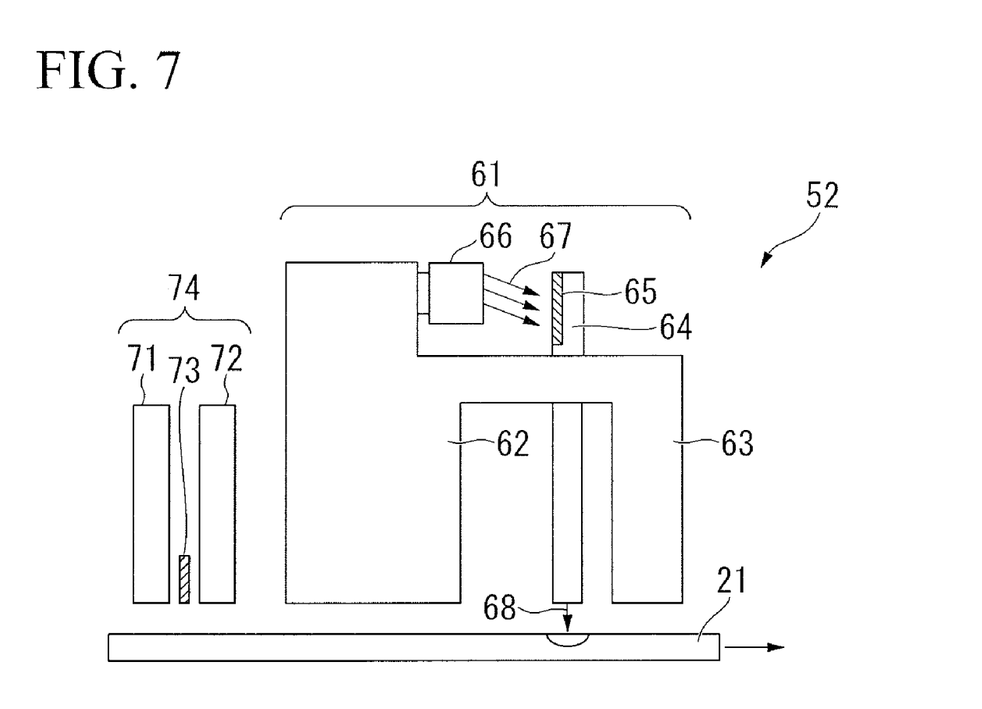
FIG. 7 is a diagram illustrating one example of a magnetic head used in a magnetic storage device of the present invention.

FIG. 7 schematically illustrates the structure of the magnetic head installed in the magnetic storage device.

As illustrated in FIG. 7, the magnetic head 52 includes a recording head 61 and a reproduction head 74. The recording head 61 includes an upper magnetic pole 63, a lower magnetic pole 62, and a PSIM (Planar Solid Immersion Mirror) 64 sandwiched between the two magnetic poles. The PSIM 64 may have a conventional structure such as that disclosed in Jpn. J. Appl. Phys., vol. 45, no. 2B, pp. 1314 to 1320 (2006). A semiconductor laser 67 is irradiated onto the waveguide (grating portion) 65 of the PSIM 64 from a laser generation unit (laser light source) 66, and the magnetic recording medium 21 can be heated by a near-field light 68 generated from the tip of the PSIM 64. The reproduction head 74 is composed of a TMR element 73 sandwiched between an upper shield 72 and a lower shield 71.

Using the recording head 52 described above, each of the magnetic recording media 21 to 24 was heated to 300 to 450° C., and when an all-one pattern signal having a linear recording density of 2000 kFCI (kilo Flux Changes per Inch) was recorded onto the medium and then reproduced, favorable overwrite characteristics and a high SN ratio were obtained in each case.

INDUSTRIAL APPLICABILITY

The present invention relates to a heat-assisted magnetic recording medium and a magnetic storage device, and relates more particularly to a heat-assisted magnetic recording medium in which the magnetic cluster size can be reduced, and the ratio Hc/Hk between the coercive force Hc and the anisotropic magnetic field Hk can be increased, and a magnetic storage device that uses such a heat-assisted magnetic recording medium. Accordingly, the present invention can be used in industries relating to the production and use of heat-assisted magnetic recording media and magnetic storage devices.

DESCRIPTION OF THE REFERENCE SYMBOLS

1: Substrate
2: First underlayer (seed layer)
3: Second underlayer (Cr alloy underlayer)
4: Third underlayer (MgO underlayer)
5: Magnetic layer
6: Carbon protective film
7: Lubricant
8: MgO underlayer
9: Heat sink layer
10: FeCoTaSiB alloy layer (soft magnetic alloy)
11: Ru layer
12: FeCoTaSiB alloy layer (soft magnetic alloy)
13: Soft magnetic underlayer (SUL)
21, 22, 23, 24: Magnetic recording medium
50: Magnetic storage device
51: Medium drive unit
52: Magnetic head
53: Head drive unit
54: Recording and reproduction signal processing system
61: Recording head
62: Lower magnetic pole
63: Upper magnetic pole
64: PSIM
65: Waveguide (grating portion)

66: Laser light source (laser generation unit)
67: Semiconductor laser
68: Near-field light
71: Lower shield
72: Upper shield
73: TMR element
74: Reproduction head

The invention claimed is:

1. A heat-assisted magnetic recording medium comprising a substrate, underlayers formed on the substrate, and a magnetic layer which is formed on the underlayers and comprises either an FePt alloy having an $L1_0$ structure or a CoPt alloy having an $L1_0$ structure as a main component, wherein
the underlayers comprise a first underlayer formed from an amorphous alloy, a second underlayer formed from an alloy having a BCC structure containing Cr as a main component and also containing at least one element selected from among Ti, Mo, W, V, Mn and Ru, and a third underlayer formed from MgO.

2. A heat-assisted magnetic recording medium comprising a substrate, underlayers formed on the substrate, and a magnetic layer which is formed on the underlayers and comprises either an FePt alloy having an $L1_0$ structure or a CoPt alloy having an $L1_0$ structure as a main component, wherein
the underlayers comprise a first underlayer formed from an amorphous alloy, and a second underlayer formed from an alloy having a BCC structure containing Cr as a main component and also containing at least one element selected from among Ti, Mo, W, V, Mn and Ru.

3. The heat-assisted magnetic recording medium according to claim 1, wherein the second underlayer further comprises at least one element selected from among B, C and Si.

4. The heat-assisted magnetic recording medium according to claim 1, wherein the first underlayer comprises Ni and at least one element selected from among Ta, Nb, Ti, Zr, Hf, W, Mo, B, Si and C.

5. The heat-assisted magnetic recording medium according to claim 1, wherein the first underlayer comprises Co and at least one element selected from among Ta, Nb, Ti, Zr, Hf, W, Mo, B, Si and C.

6. The heat-assisted magnetic recording medium according to claim 1, wherein the first underlayer comprises Cr and at least one element selected from among Ta, Nb, Ti, Zr, Hf, B, Si and C.

7. The heat-assisted magnetic recording medium according to claim 1, wherein the first underlayer comprises Cu and at least one element selected from among Ta, Nb, Ti, Zr, Hf, B, Si and C.

8. The heat-assisted magnetic recording medium according to claim 1, wherein the first underlayer comprises at least one element selected from among Pd, Mo, W, Ti, Zr, Mn, Ta and Nb, and at least one element selected from among Si, B and C.

9. The heat-assisted magnetic recording medium according to claim 1, wherein a heat sink layer is formed between the substrate and the first underlayer.

10. The heat-assisted magnetic recording medium according to claim 1, wherein a soft magnetic underlayer formed from an antiferromagnetically coupled soft magnetic alloy is formed between the substrate and the first underlayer.

11. A magnetic storage device comprising:
a magnetic recording medium,
a medium drive unit for rotating the magnetic recording medium,
a laser generation unit for heating the magnetic recording medium,
a magnetic head comprising a waveguide that guides laser light generated by the laser generation unit to a tip of the head,
a head drive unit for moving the magnetic head, and
a recording and reproduction signal processing system, wherein
the magnetic recording medium is the heat-assisted magnetic recording medium according to claim 1.

12. The heat-assisted magnetic recording medium according to claim 2, wherein the second underlayer further comprises at least one element selected from among B, C and Si.

13. The heat-assisted magnetic recording medium according to claim 2, wherein the first underlayer comprises Ni and at least one element selected from among Ta, Nb, Ti, Zr, Hf, W, Mo, B, Si and C.

14. The heat-assisted magnetic recording medium according to claim 2, wherein the first underlayer comprises Co and at least one element selected from among Ta, Nb, Ti, Zr, Hf, W, Mo, B, Si and C.

15. The heat-assisted magnetic recording medium according to claim 2, wherein the first underlayer comprises Cr and at least one element selected from among Ta, Nb, Ti, Zr, Hf, B, Si and C.

16. The heat-assisted magnetic recording medium according to claim 2, wherein the first underlayer comprises Cu and at least one element selected from among Ta, Nb, Ti, Zr, Hf, B, Si and C.

17. The heat-assisted magnetic recording medium according to claim 2, wherein the first underlayer comprises at least one element selected from among Pd, Mo, W, Ti, Zr, Mn, Ta and Nb, and at least one element selected from among Si, B and C.

18. The heat-assisted magnetic recording medium according to claim 2, wherein a heat sink layer is formed between the substrate and the first underlayer.

19. The heat-assisted magnetic recording medium according to claim 2, wherein a soft magnetic underlayer formed from an antiferromagnetically coupled soft magnetic alloy is formed between the substrate and the first underlayer.

20. A magnetic storage device comprising:
a magnetic recording medium,
a medium drive unit for rotating the magnetic recording medium,
a laser generation unit for heating the magnetic recording medium,
a magnetic head comprising a waveguide that guides laser light generated by the laser generation unit to a tip of the head,
a head drive unit for moving the magnetic head, and
a recording and reproduction signal processing system, wherein
the magnetic recording medium is the heat-assisted magnetic recording medium according to claim 2.

* * * * *